(12) United States Patent
Suzuki et al.

(10) Patent No.: US 8,771,131 B2
(45) Date of Patent: *Jul. 8, 2014

(54) TRANSMISSION DEVICE

(75) Inventors: Tomohide Suzuki, Kariya (JP); Tsuyoshi Fukaya, Kariya (JP)

(73) Assignee: Aisin Aw Co., Ltd., Aichi-Ken (JP)

( * ) Notice: Subject to any disclaimer, the term of this patent is extended or adjusted under 35 U.S.C. 154(b) by 197 days.

This patent is subject to a terminal disclaimer.

(21) Appl. No.: 13/446,439

(22) Filed: Apr. 13, 2012

(65) Prior Publication Data

US 2012/0264560 A1   Oct. 18, 2012

(30) Foreign Application Priority Data

Apr. 15, 2011   (JP) ................................. 2011-091512

(51) Int. Cl.
*F16H 3/44* (2006.01)

(52) U.S. Cl.
USPC ........................................ 475/286

(58) Field of Classification Search
USPC ................................. 475/286, 287
See application file for complete search history.

(56) References Cited

U.S. PATENT DOCUMENTS

| | | | | |
|---|---|---|---|---|
| 3,996,817 A * | 12/1976 | Winzeler | ........................ | 475/69 |
| 4,046,031 A * | 9/1977 | Ott et al. | ....................... | 475/280 |
| 4,070,927 A | 1/1978 | Polak | | |
| 4,683,776 A * | 8/1987 | Klemen | ....................... | 475/286 |
| 5,460,579 A | 10/1995 | Kappel et al. | | |
| 8,105,198 B2 * | 1/2012 | Hart et al. | ...................... | 475/286 |
| 8,257,215 B2 * | 9/2012 | Borntraeger | ................. | 475/149 |
| 8,535,195 B2 * | 9/2013 | Fukaya et al. | ................ | 475/286 |
| 2005/0192150 A1 * | 9/2005 | Shim | .............................. | 475/275 |
| 2010/0081537 A1 * | 4/2010 | Sakaue et al. | ................ | 475/331 |
| 2012/0264560 A1 * | 10/2012 | Suzuki et al. | ................ | 475/276 |

FOREIGN PATENT DOCUMENTS

| | | |
|---|---|---|
| JP | 52-149562 A | 12/1977 |
| JP | 03-056745 A | 3/1991 |
| JP | 5-033850 A | 2/1993 |
| JP | 6-323381 A | 11/1994 |
| JP | 08-128525 A | 5/1996 |
| JP | 8-152049 A | 6/1996 |

(Continued)

OTHER PUBLICATIONS

International Search Report for corresponding International Patent Application No. PCT/JP2012/059308 mailed Jun. 19, 2012.

(Continued)

*Primary Examiner* — Derek D Knight
(74) *Attorney, Agent, or Firm* — Sughrue Mion, PLLC

(57) ABSTRACT

A transmission device capable of transmitting power applied to an input shaft to an output shaft while changing a speed ratio to a plurality of stages, including a single-pinion type first planetary gear mechanism, a single-pinion type second planetary gear mechanism a third planetary gear mechanism; first clutch and second clutches; and first and second brakes. The first planetary gear mechanism is disposed more toward the input shaft side than the second planetary gear mechanism, and the second planetary gear mechanism is disposed more toward the input shaft side than the third planetary gear mechanism, and the first brake is disposed circumferentially outward of the second planetary gear mechanism so as to at least partially overlap with the second planetary gear mechanism, and the second brake is disposed circumferentially outward of the first planetary gear mechanism so as to at least partially overlap with the first planetary gear mechanism.

9 Claims, 8 Drawing Sheets

(56) References Cited

FOREIGN PATENT DOCUMENTS

| | | |
|---|---|---|
| JP | 11-063014 A | 3/1999 |
| jp | 2004-068915 A | 3/2004 |
| JP | 2005-241002 A | 9/2005 |
| JP | 2007-154919 A | 6/2007 |
| JP | 2010-084806 A | 4/2010 |
| WO | 2010/029035 A1 | 3/2010 |

OTHER PUBLICATIONS

U.S. Appl. No. 13/446,836, filed by Tsuyoshi Fukaya on Apr. 13, 2012.

International Search Report for corresponding International Patent Application No. PCT/JP2012/059234 dated May 29, 2012.

* cited by examiner

F I G . 3
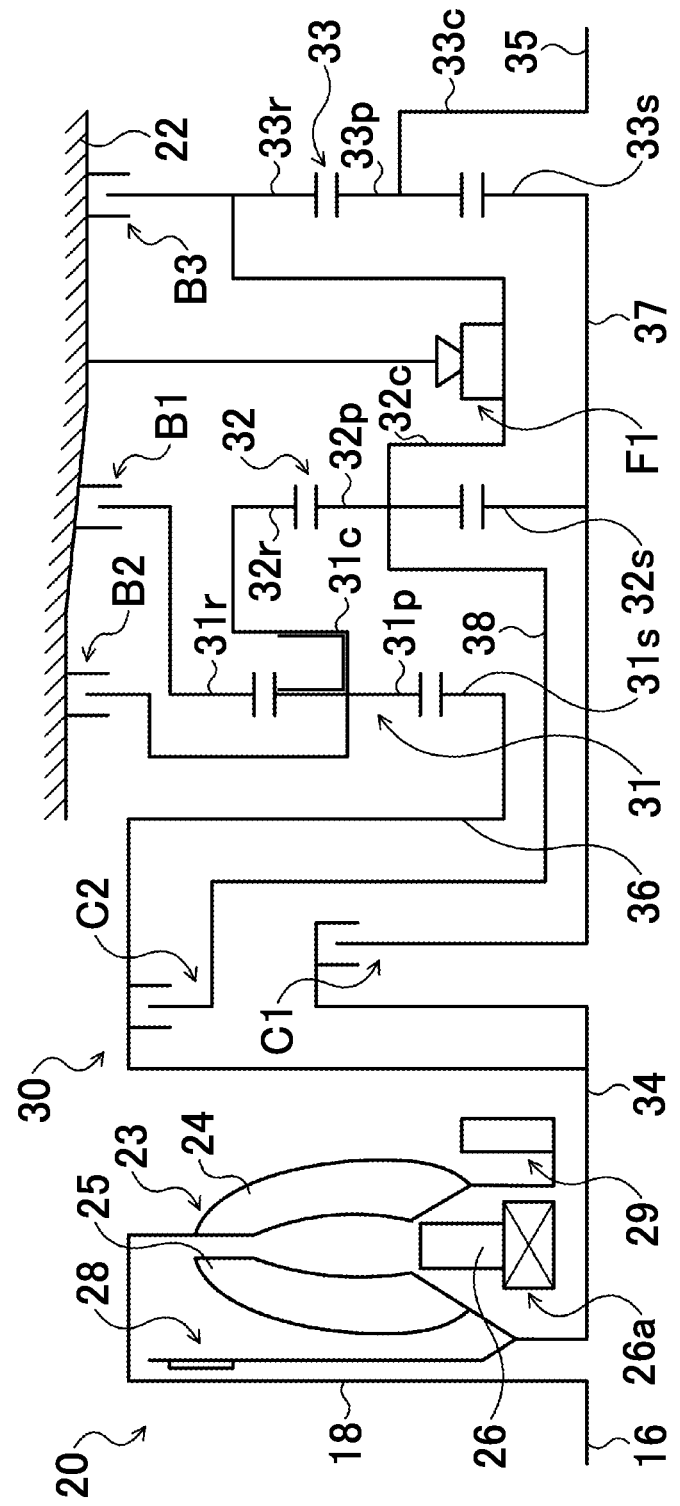

FIG.4

|  | C1 | C2 | B1 | B2 | B3 | F1 |
|---|---|---|---|---|---|---|
| P |  |  |  |  |  |  |
| REV |  |  | ○ |  | ○ |  |
| N |  |  |  |  |  |  |
| D 1st | ○ |  |  |  | (○) | ○ |
| D 2nd | ○ |  |  | ○ |  |  |
| D 3rd | ○ |  | ○ |  |  |  |
| D 4th | ○ | ○ |  |  |  |  |
| D 5th |  | ○ | ○ |  |  |  |
| D 6th |  | ○ |  | ○ |  |  |

\*(○): ENGAGED DURING ENGINE BRAKING

TRANSMISSION DEVICE

INCORPORATION BY REFERENCE

The disclosure of Japanese Patent Application No. 2011-091512 filed on Apr. 15, 2011 including the specification, drawings and abstract is incorporated herein by reference in its entirety.

BACKGROUND OF THE INVENTION

The present invention relates to a transmission device capable of transmitting power applied to an input shaft to an output shaft while changing a speed ratio to a plurality of stages.

Description of the Related Art

A known past example of this type of transmission device includes three single-pinion type planetary gear devices (e.g., see Japanese Patent Application Publication No. 2007-154919 (JP 2007-154919 A)). In this transmission device, brakes are respectively disposed on the outer circumferential sides of the planetary gear devices for holding ring gears of the planetary gear devices stationary to a case, and brake hubs are directly fixed to the outer circumferential sides of the ring gears of the planetary gear devices. Another known example of this type of transmission device is an automatic transmission that includes a double-pinion type first planetary gear that is disposed closest to an input shaft side (motor side), as well as single-pinion type second and third planetary gears, and a plurality of clutches and brakes. Power applied to the input shaft is transmitted to an output shaft while changing a speed ratio to a plurality of stages by engaging and disengaging the clutches and brakes to change the power transmission path (e.g., see Japanese Patent Application Publication No. 52-149562 (JP 52-149562 A)). In this automatic transmission, a first brake for holding a carrier of the first planetary gear stationary to a case is disposed on the outer circumferential side of the first planetary gear, a second brake for holding a ring gear of the second planetary gear stationary to the case is disposed on the outer circumferential side of the second planetary gear, and a third brake for holding a ring gear of the third planetary gear stationary to the case is disposed on the outer circumferential side of the third planetary gear.

SUMMARY OF THE INVENTION

Given the restrictions on brake downsizing in order to secure the required torque capacity for forming a shift speed, disposing the respective brakes for holding the fixed elements of the planetary gear devices stationary to the case on the outer circumferential sides of the planetary gear devices, as in the transmission devices according to the related art described above, may interfere with efforts to achieve a transmission device that is more compact overall.

The present invention achieves a more compact transmission device.

The transmission device according to the present invention employs the following to achieve the above.

A transmission device according to the present invention is capable of transmitting power applied to an input shaft to an output shaft while changing a speed ratio to a plurality of stages. The transmission device includes: a single-pinion type first planetary gear mechanism including a first sun gear that is coupled to the input shaft, a first carrier that rotatably supports a first pinion gear that meshes with the first sun gear, and a first ring gear that meshes with the first pinion gear; a single-pinion type second planetary gear mechanism including a second sun gear, a second carrier that rotatably supports a second pinion gear that meshes with the second sun gear, and a second ring gear that is coupled to the first carrier and meshes with the second pinion gear; a third planetary gear mechanism including a rotation element that is coupled to the second sun gear, and a rotation element that is coupled to the output shaft; a case that accommodates the first, second, and third planetary gear mechanisms; a first clutch capable of coupling and uncoupling the input shaft and the second sun gear; a second clutch capable of coupling and uncoupling the input shaft and the second carrier; a first brake that is engaged when forming a first shift speed, and capable of holding the first ring gear stationary to the case; and a second brake that is engaged when forming a second shift speed that is a lower speed than the first shift speed, and capable of holding the second ring gear stationary to the case. The first planetary gear mechanism is disposed more toward the input shaft side than the second planetary gear mechanism, and the second planetary gear mechanism is disposed more toward the input shaft side than the third planetary gear mechanism. The first brake is disposed circumferentially outward of the second planetary gear mechanism so as to at least partially overlap with the second planetary gear mechanism as viewed from a radial direction, and the second brake is disposed circumferentially outward of the first planetary gear mechanism so as to at least partially overlap with the first planetary gear mechanism as viewed from the radial direction.

In the transmission device, the second planetary gear mechanism is disposed between the first planetary gear mechanism disposed on the input shaft side and the third planetary gear mechanism coupled to the output shaft, and the second ring gear of the second planetary gear mechanism is held stationary by the second brake when forming the second shift speed, which is a lower speed than the first shift speed at which the first ring gear is held stationary by the first brake. The first brake is disposed circumferentially outward of the second planetary gear mechanism so as to at least partially overlap with the second planetary gear mechanism as viewed from the radial direction, and the second brake is disposed circumferentially outward of the first planetary gear mechanism so as to at least partially overlap with the first planetary gear mechanism as viewed from the radial direction. The second brake requires a larger torque capacity than the first brake when engaged to form the second shift speed, and the second brake may be at least partially disposed circumferentially outward of the first planetary gear mechanism that is disposed on the input shaft side. In such case, although the size of the case generally increases on the input shaft side, the torque capacity of the second brake can be secured while suppressing an increase in the size of the case on the outer circumferential side of the first planetary gear mechanism. If the first brake that has a smaller required torque capacity compared to the second brake is at least partially disposed circumferentially outward of the second planetary gear mechanism, an increase in the size of the case on the outer circumferential side of the second planetary gear mechanism can be suppressed. Thus, according to the present invention, a more compact transmission device can be achieved.

The first carrier and the second ring gear may be coupled to each other through a fitted portion without an aligning function. Thus, compared to coupling the first carrier and the second ring gear to each other through a spline fitted portion (involute spline) with an aligning function, for example, the first carrier and the second ring gear can be coupled while closer together in the axial direction. As a consequence, the axial length of the transmission device can be further shortened.

The first carrier and the second ring gear may be coupled through a coupling member that includes an outer circumferential portion fitted to an inner circumferential portion of the second ring gear, and an inner circumferential portion fitted to the first carrier. In addition, the coupling member may be fitted with at least radial play to at least one of the second ring gear and the first carrier. Thus, the axial length of the transmission device can be shortened, while easily configuring the fitted portion without an aligning portion between the second ring gear and the first carrier.

The first carrier may include a ring-like radially-extending portion that rotatably supports the first pinion gear, and an axially-extending portion that axially extends from an inner circumferential portion of the radially-extending portion toward the second planetary gear mechanism. The coupling member may be fitted to the axially-extending portion of the first carrier. The first ring gear may be fixed to a ring-like flange member that is rotatably supported by the axially-extending portion between the radially-extending portion of the first carrier and the coupling member. Thus, an increase in the axial length of the transmission device can be suppressed, while more precisely aligning the first ring gear around the center axis of the transmission device.

A first brake hub that configures the first brake may be fixed to the flange member at a position that overlaps with the axially-extending portion of the first carrier as viewed from the radial direction. Thus, an increase in the axial length of the transmission device can be suppressed, while also enabling coupling of the first ring gear and the first brake hub of the first brake.

An inner circumferential portion of the flange member may be axially offset toward the coupling member, and a thrust bearing may be disposed on both axial sides of the inner circumferential portion of the flange member. Thus, an increase in the axial length of the transmission device can be suppressed, while also axially supporting the flange member to which the first ring gear is fixed.

The third planetary gear mechanism may be a single-pinion type planetary gear mechanism including a third sun gear that is coupled to the second sun gear, a third carrier that is coupled to the output shaft and rotatably supports a third pinion gear that meshes with the third sun gear, and a third ring gear that is coupled to the second carrier and meshes with the third pinion gear. In addition, the transmission device may further include a third brake capable of holding the third ring gear stationary to the case. Thus, the transmission device can be made more compact overall, and the number of parts can be reduced.

BRIEF DESCRIPTION OF THE DRAWINGS

FIG. 3 is a schematic configuration diagram of the power transmission device 20;

FIG. 4 is an operation chart that shows the relationship between the operation states of clutches and brakes, and the shift speeds of the transmission device 30;

DETAILED DESCRIPTION OF THE EMBODIMENT

Next, an embodiment of the present invention will be described.

Figure 1:
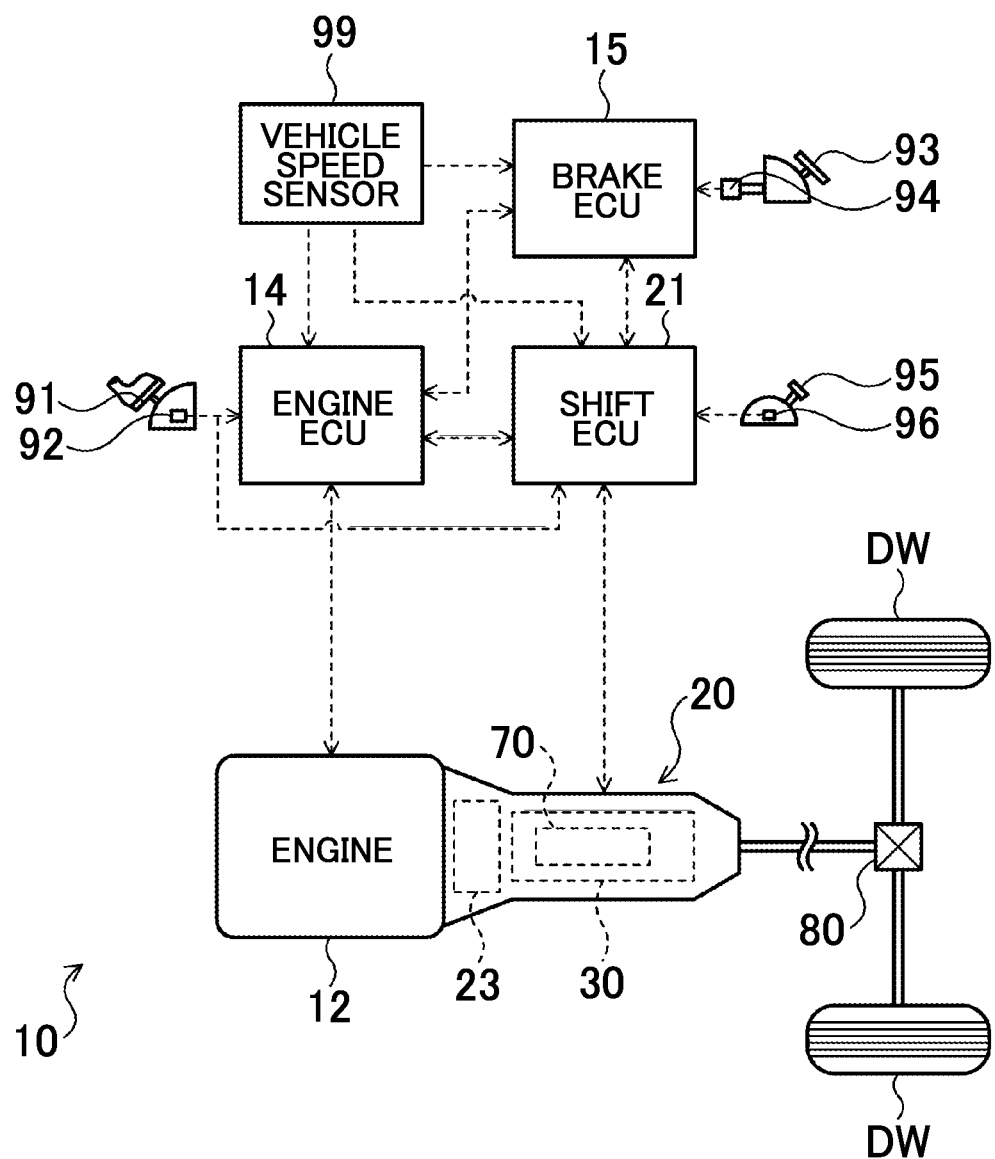
FIG. 1 is a schematic configuration diagram of an automobile 10, which is a vehicle mounted with a power transmission device 20 that includes a transmission device 30 according to an embodiment of the present invention.

FIG. 1 is a schematic configuration diagram of an automobile 10, which is a vehicle mounted with a power transmission device 20 that includes a transmission device 30 according to the embodiment of the present invention. The automobile 10 shown in the figure is configured as a rear-wheel-drive vehicle. The automobile 10 includes an engine 12, an engine electronic control unit (hereinafter, "engine ECU") 14, a brake electronic control unit (hereinafter, "brake ECU") 15, and the power transmission device 20. The engine 12 serves as a motor and is an internal combustion engine that outputs power from an explosive combustion of a mixture of air and hydrocarbon fuel such as gasoline or diesel. The engine ECU 14 controls the engine 12. The brake ECU 15 controls an electronically controlled hydraulic brake unit (not shown). The power transmission device 20 includes a fluid transmission device (start-off device) 23 and a stepped transmission device (automatic transmission) 30, a hydraulic control device 70 that supplies and discharges hydraulic oil (hydraulic fluid) to and from these, and a shift electronic control unit (hereinafter, "shift ECU") 21 that controls these. The power transmission device 20 is connected to a crankshaft 16 of the engine 12, and transmits power from the engine 12 to left and right drive wheels (rear wheels) DW through a differential gear 80.

Figure 2:
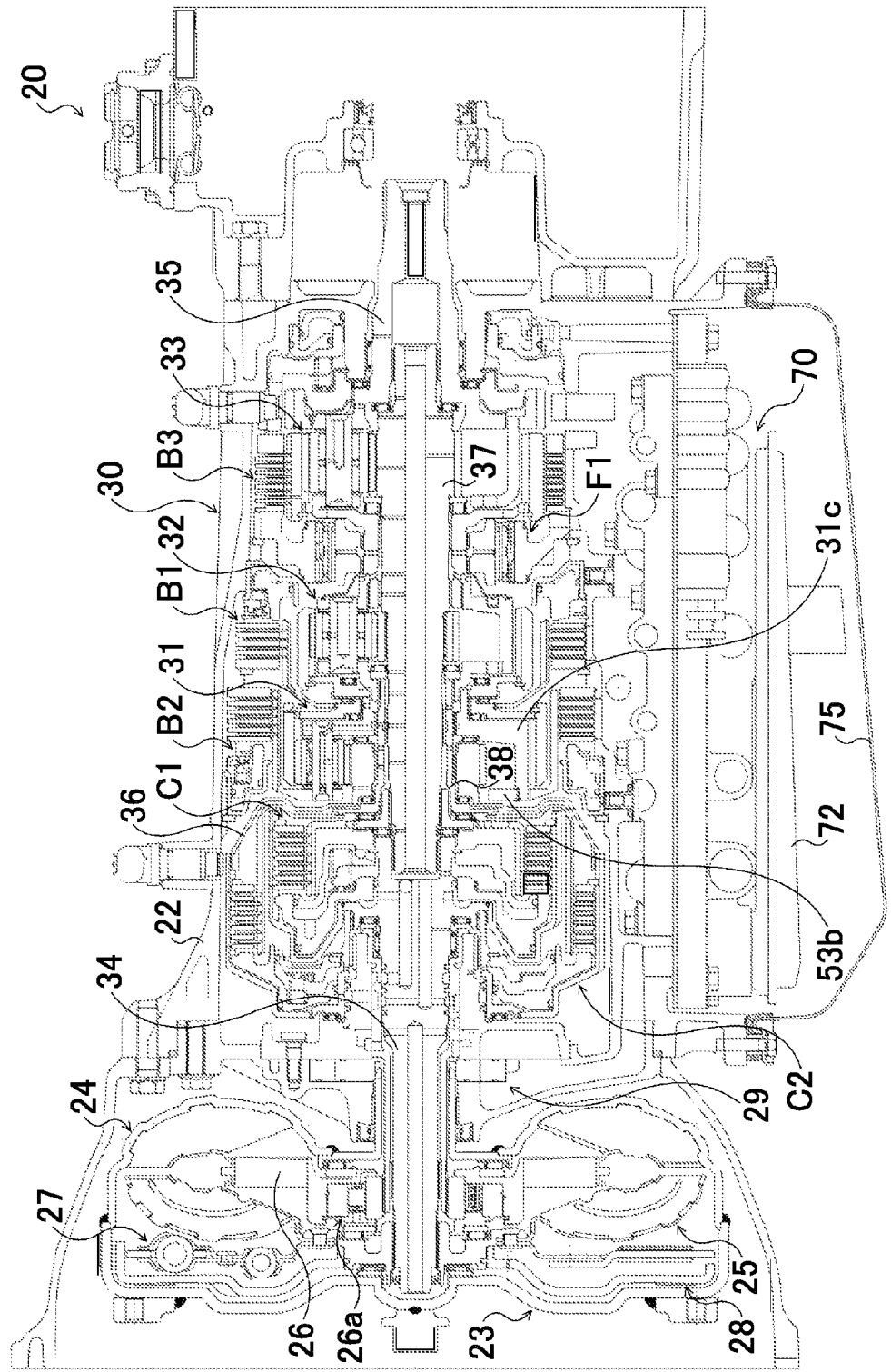
FIG. 2 is a sectional view that shows the power transmission device 20.

As shown in FIGS. 2 and 3, the power transmission device 20 includes the fluid transmission device 23; and a transmission case 22 that accommodates an oil pump 29 serving as a hydraulic pressure generating source, the transmission device 30, and so forth. The fluid transmission device 23 is configured as a fluid torque converter. The fluid transmission device 23 includes a pump impeller 24 that is connected to the crankshaft 16 of the engine 12 through a front cover 18; a turbine runner 25 that is fixed to an input shaft 34 of the transmission device 30 through a turbine hub; a stator 26 that is disposed inward of the pump impeller 24 and the turbine runner 25 and rectifies the flow of hydraulic oil (ATF) from the turbine runner 25 to the pump impeller 24; a one-way clutch 26a that restricts the rotation of the stator 26 to one direction; a damper mechanism 27; and a lock-up clutch 28. The oil pump 29 serves as a hydraulic pressure generating source, and is configured as a gear pump that includes a pump assembly formed from a pump body and a pump cover; and an external gear that is connected to the pump impeller 24 of the fluid transmission device 23 through a hub. The oil pump 29 is also connected to the hydraulic control device 70.

The transmission device 30 is configured as a six-speed stepped automatic transmission. As shown in FIGS. 2 and 3, the transmission device 30 includes a first planetary gear mechanism 31, a second planetary gear mechanism 32, and a third planetary gear mechanism 33, all of which are single-pinion type planetary gears; the input shaft 34; an output shaft 35; and two clutches C1 and C2, three brakes B1, B2, and B3, and a one-way clutch F1 for changing the power transmission path from the input shaft 34 to the output shaft 35. As shown in the figure, the first to third planetary gear mechanisms 31 to 33, the clutches C1, C2, the brakes B1 to B3, and the one-way clutch F1 are accommodated inside the transmission case 22. The input shaft 34 of the transmission device 30 is coupled to the crankshaft of the engine 12 through the fluid transmission device 23, and the output shaft 35 is coupled to the drive wheels DW through the differential gear 80 (see FIG. 1).

The first planetary gear mechanism 31 is disposed most toward the engine 12 side (vehicle front) among the first, second, and third planetary gear mechanisms 31 to 33, that is, nearest to the input shaft 34, and configures a speed change gear mechanism together with the next-nearest second planetary gear mechanism 32. The first planetary gear mechanism 31 includes a first sun gear 31s that is an external gear; a first ring gear 31r that serves as a fixable element and is an internal gear concentrically disposed with the first sun gear 31s; and a first carrier 31c that rotatably and revolvably holds a plurality of first pinion gears 31p that meshes with the first sun gear 31s and meshes with the first ring gear 31r. The first sun gear 31s of the first planetary gear mechanism 31 is fixed to a ring-like coupling drum 36 that is coupled to (in spline engagement with) a clutch drum of the clutch C1, which can rotate together with the input shaft 34.

The second planetary gear mechanism 32 is provided in a line with the first planetary gear mechanism 31 on the output shaft 35 side (vehicle rear side) of the first planetary gear mechanism 31. The second planetary gear mechanism 32 includes a second sun gear 32s that is an external gear; a second ring gear 32r that serves as a fixable element and is an internal gear concentrically disposed with the second sun gear 32s; and a second carrier 32c that rotatably and revolvably holds a plurality of second pinion gears 32p that meshes with the second sun gear 32s and meshes with the second ring gear 32r. The second sun gear 32s of the second planetary gear mechanism 32 is fixed to an intermediate shaft 37 that is disposed between the input shaft 34 and the output shaft 35 and rotatable relative to both. The second ring gear 32r of the second planetary gear mechanism 32 is coupled to the first carrier 31c of the first planetary gear mechanism 31. The second carrier 32c of the second planetary gear mechanism 32 is fixed to a sleeve 38 that is coaxially and rotatably supported by the intermediate shaft 37.

The third planetary gear mechanism 33 serves as a speed reducing gear mechanism and is disposed most toward the output shaft 35 (vehicle rear) among the first to third planetary gear mechanisms 31 to 33. The third planetary gear mechanism 33 includes a third sun gear 33s that is an external gear; a third ring gear 33r that serves as a fixable element and is an internal gear concentrically disposed with the third sun gear 33s; and a third carrier 33c that rotatably and revolvably holds a plurality of third pinion gears 33p that meshes with the third sun gear 33s and meshes with the third ring gear 33r. The third sun gear 33s of the third planetary gear mechanism 33 is fixed to the intermediate shaft 37 and coupled to the second sun gear 32s of the second planetary gear mechanism 32. The third ring gear 33r of the third planetary gear mechanism 33 is coupled to the second carrier 32c of the second planetary gear mechanism 32. The third carrier 33c of the third planetary gear mechanism 33 is coupled to the output shaft 35.

The clutch C1 is a multi-plate hydraulic clutch that can couple and uncouple the input shaft 34 and the intermediate shaft 37, that is, the second sun gear 32s of the second planetary gear mechanism 32 and the third sun gear 33s of the third planetary gear mechanism 33. The clutch C2 is a multi-plate hydraulic clutch that can couple and uncouple the input shaft 34 and the sleeve 38, that is, the second carrier 32c of the second planetary gear mechanism 32. The one-way clutch F1 allows only positive rotation of the second carrier 32c of the second planetary gear mechanism 32 and the third ring gear 33r of the third planetary gear mechanism 33, and restricts their negative rotation.

The brake B1 is a multi-plate hydraulic brake that can hold the first ring gear 31r of the first planetary gear mechanism 31 stationary to the transmission case 22 and cancel such holding of the first ring gear 31r to the transmission case 22. The brake B2 is a multi-plate hydraulic brake that can hold the first carrier 31c of the first planetary gear mechanism 31 stationary to the transmission case 22 to hold the second ring gear 32r of the second planetary gear mechanism 32 stationary to the transmission case 22, and cancel such holding of the first carrier 31c and the second ring gear 32r to the transmission case 22. The brake B3 is a multi-plate hydraulic brake that can hold the second carrier 32c of the second planetary gear mechanism 32 and the third ring gear 33r of the third planetary gear mechanism 33 stationary to the transmission case 22, and cancel such holding of the second carrier 32c and the third ring gear 33r to the transmission case 22.

Figure 5:
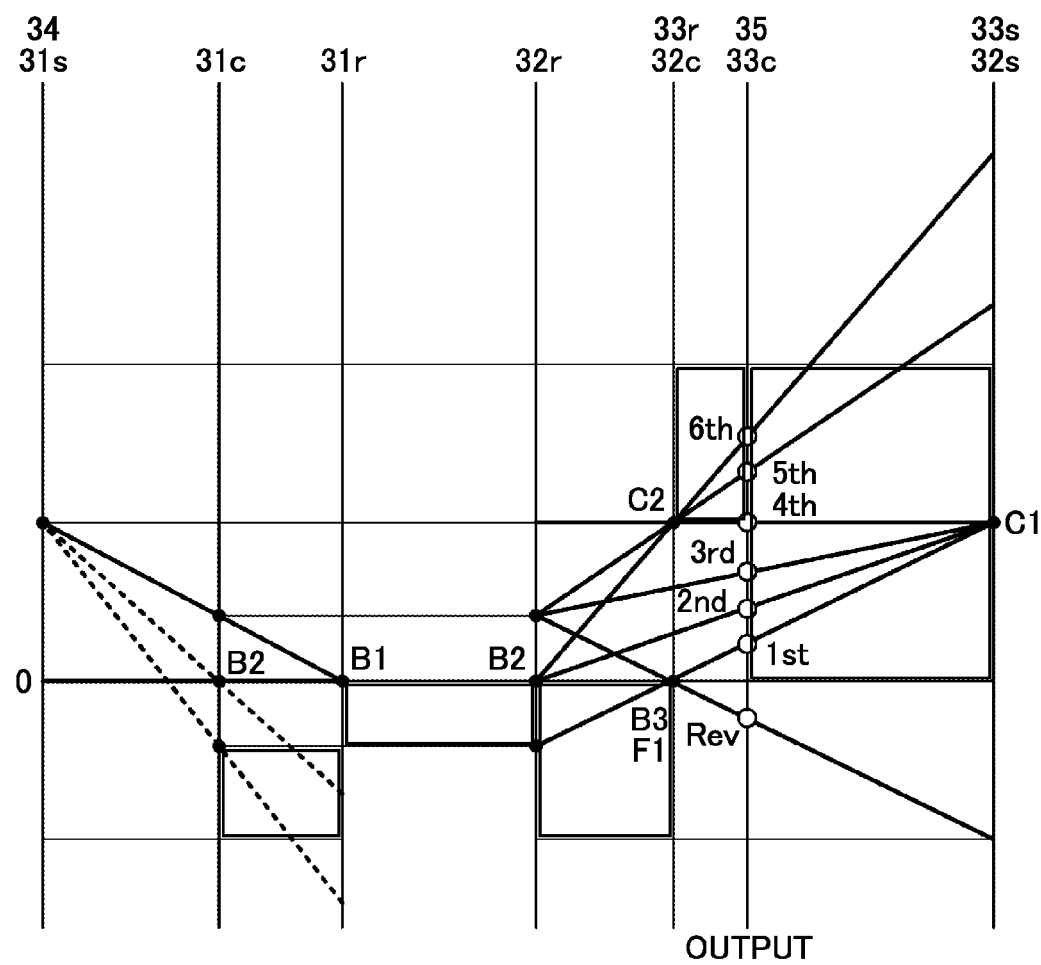
FIG. 5 is a line diagram that shows an example of the relationship between the rotation speeds of rotation elements that configure the transmission device 30.

The clutches C1 and C2 and the brakes B1 to B3 described above are operated through the supply and discharge of hydraulic oil by the hydraulic control device 70. FIG. 4 shows an operation chart that expresses the relationship between the operation states of clutches C1 and C2 and brakes B1 to B3, and the shift speeds of the transmission device 30. FIG. 5 shows a line diagram that gives an example of the relationship between the rotation speeds of rotation elements that configure the transmission device 30. The transmission device 30 provides first to sixth forward speeds and one reverse speed as shown in FIG. 5 by setting the clutches C1 and C2 and the brakes B1 to B3 to the states shown in the operation chart of FIG. 4.

Figure 6:
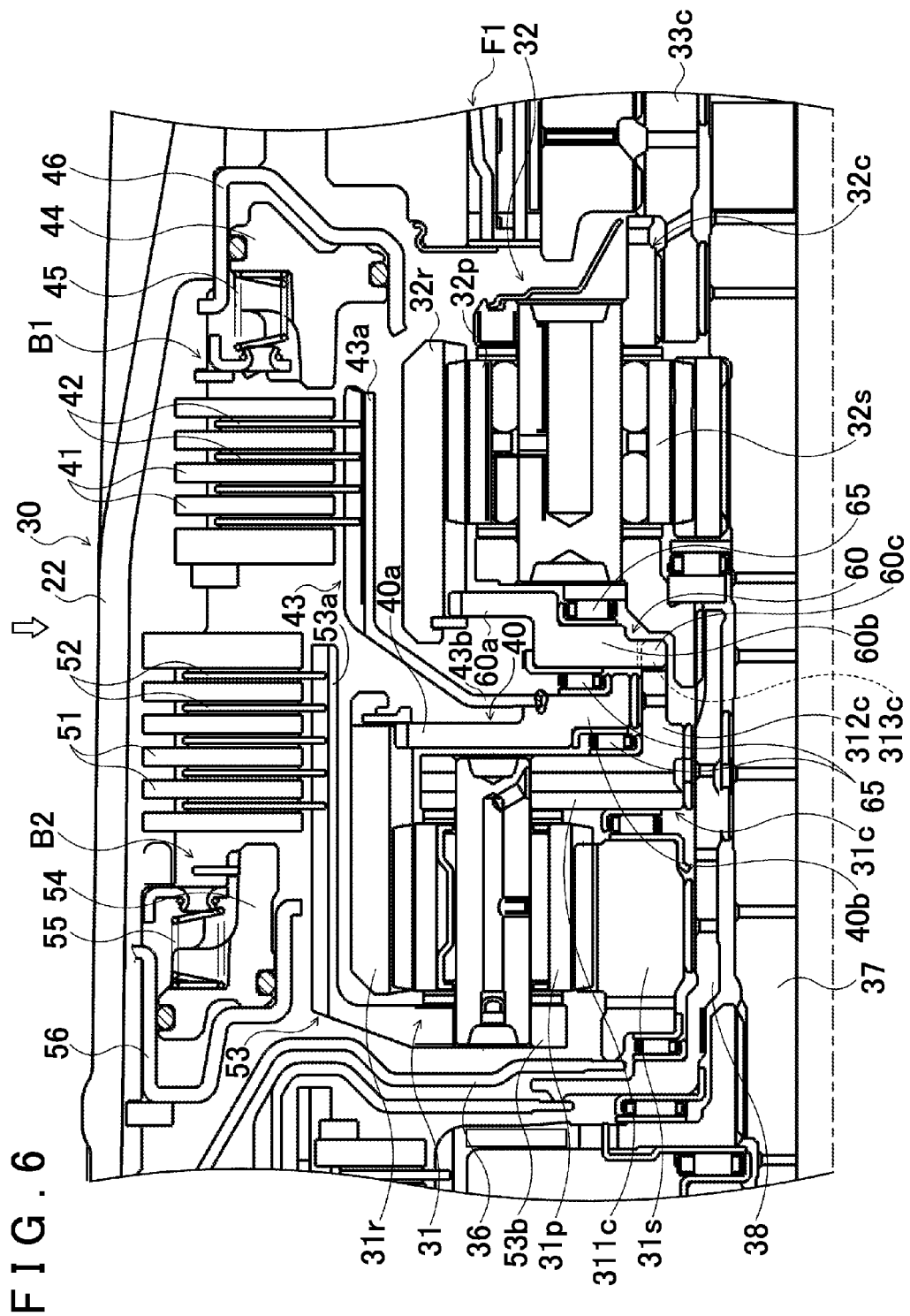
FIG. 6 is an enlarged view of an essential portion of the transmission device 30.

FIG. 6 is an enlarged view of an essential portion of the transmission device 30. The brake B1 is used to hold the first ring gear 31r of the first planetary gear mechanism 31 stationary to the transmission case 22 when forming the third speed, fifth speed, and reverse speed of the transmission device 30. As shown in the figure, the brake B1 includes a plurality of first friction plates (mating plates) 41 that are fitted to (in spline engagement with) an inner circumferential portion of the transmission case 22 and slidably supported by the transmission case 22; a plurality of second friction plates (members with a friction material on both surfaces) 42 disposed between adjacent first friction plates 41; a first brake hub 43 that includes a cylindrical outer circumferential portion 43a that is coupled to the first ring gear 31r of the first planetary gear mechanism 31 to be fastened (fixed) through a ring gear flange (flange member) 40, and fitted to (in spline engagement with) the plurality of second friction plates 42; a first piston 44 that can axially move relative to the transmission case 22 to press the first and second friction plates 41, 42; a plurality of first return springs 45 that axially biases the first piston 44 away from the first and second friction plates 41, 42; and a first oil chamber defining member 46 that is fixed to the transmission case 22 and defines an engagement oil chamber at the back of the first piston 44 (on a side of the first piston 44 opposite from the first return springs 45).

The brake B2 is used to hold the second ring gear 32r of the second planetary gear mechanism 32 stationary to the transmission case 22 when forming the second speed and sixth speed of the transmission device 30. The brake B2 includes a plurality of first friction plates (mating plates) 51 that are fitted to (in spline engagement with) the inner circumferential portion of the transmission case 22 and slidably supported by the transmission case 22; a plurality of second friction plates (members with a friction material on both surfaces) 52 disposed between adjacent first friction plates 51; a second brake hub 53 that includes a cylindrical outer circumferential portion 53a that is coupled to the second ring gear 32r of the second planetary gear mechanism 32 to be fastened (fixed) through a coupling member 60 and the first carrier 31c of the first planetary gear mechanism 31, and fitted to (in spline engagement with) the plurality of second friction plates 52; a second piston 54 that can axially move relative to the transmission case 22 to press the first and second friction plates 51, 52; a plurality of second return springs 55 that axially biases the second piston 54 away from the first and second friction plates 51, 52; and a second oil chamber defining member 56 that is fixed to the transmission case 22 and defines an engagement oil chamber at the back of the second piston 54 (on a side of the second piston 54 opposite from the second return springs 55).

As shown in FIG. 6, the first and second friction plates 41, 42, the outer circumferential portion 43a of the first brake hub 43, the first piston 44, the first return springs 45, and a portion of the first oil chamber defining member 46, which all configure the brake B1, are disposed circumferentially outward of the second planetary gear mechanism 32 so as to overlap with the second planetary gear mechanism 32 as viewed from the radial direction (see the white arrow in FIG. 6). The first brake hub 43 of the brake B1 includes an inner circumferential portion 43b that extends radially inward from one end of the outer circumferential portion 43a and is disposed between the first planetary gear mechanism 31 and the second planetary gear mechanism 32. The inner circumferential portion 43b is fixed to the ring gear flange 40 mentioned above. The ring gear flange 40 is formed ring-like, and includes an outer circumferential portion 40a that is fitted to an inner circumferential portion of the first ring gear 31r of the first planetary gear mechanism 31 and axially fixed to the first ring gear 31r by a snap ring; and an inner circumferential portion 40b that is axially offset from the outer circumferential portion 40a toward the second planetary gear mechanism 32 (the coupling member 60). In the embodiment, the outer circumferential portion 40a of the ring gear flange 40 is formed with gear teeth that mesh with the gear teeth of the first ring gear 31r, and together with the gear teeth configure a fitted portion with an aligning function. The first carrier 31c of the first planetary gear mechanism 31 includes a ring-like radially-extending portion 311c that rotatably supports the plurality of first pinion gears 31p; and an axially-extending portion 312c that axially extends from an inner circumferential portion of the radially-extending portion 311c toward the second planetary gear mechanism 32 (the coupling member 60). The ring gear flange 40 is rotatably supported through a bush by the axially-extending portion 312c of the first carrier 31c between the radially-extending portion 311c and the coupling member 60. The first brake hub 43 of the brake B1 is fixed by welding or the like, for example, to the inner circumferential portion 40b of the ring gear flange 40 at a position that overlaps with the axially-extending portion 312c of the first carrier 31c as viewed from the radial direction.

Figure 7:
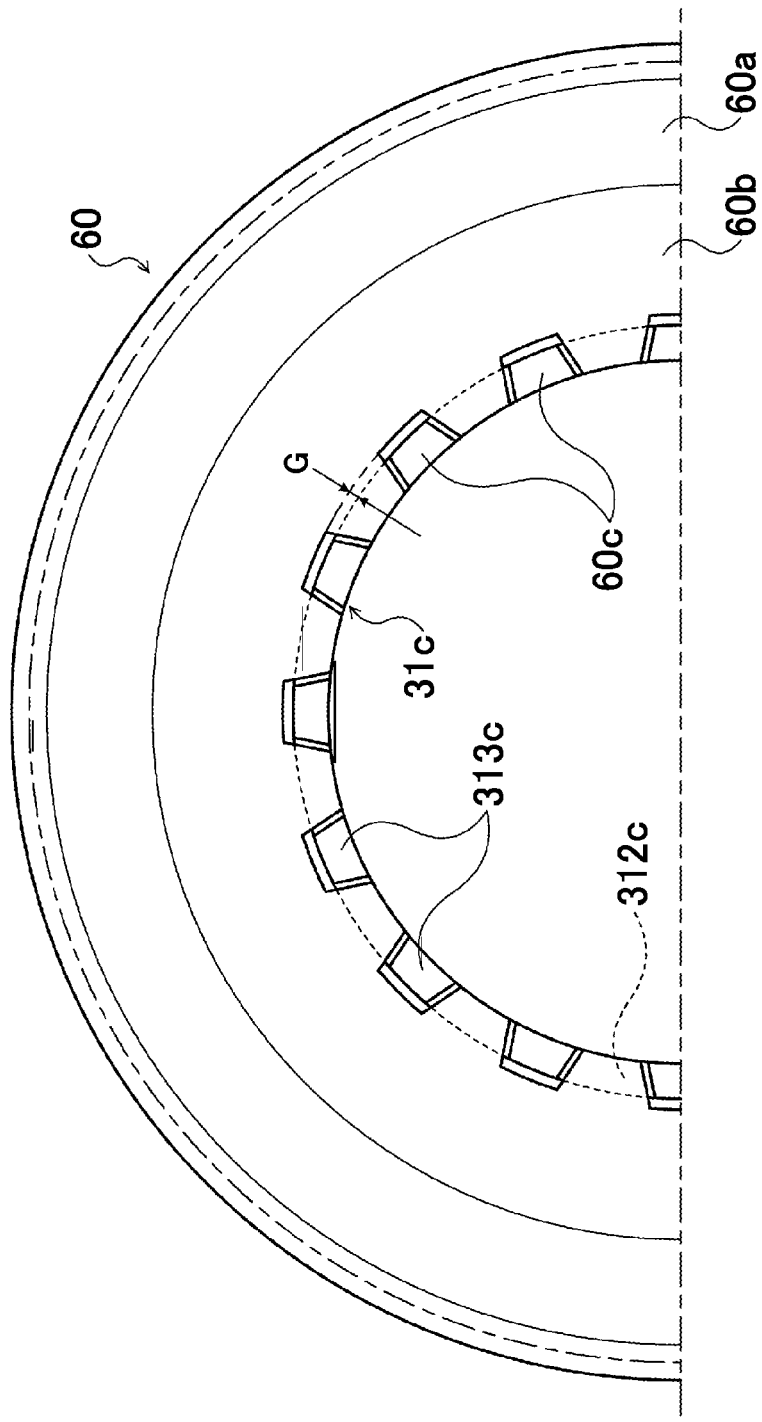
FIG. 7 is an explanatory diagram that shows a fitted portion between a coupling member 60 and a first carrier 31c.

Meanwhile, a portion of the first and second friction plates 51, 52, the outer circumferential portion 53a of the second brake hub 53, a portion of the second piston 54, the second return springs 55, and a portion of the second oil chamber defining member 56, which all configure the brake B2, are disposed circumferentially outward of the first planetary gear mechanism 31 so as to overlap with the first planetary gear mechanism 31 as viewed from the radial direction, as shown in FIG. 6. The second brake hub 53 of the brake B2 includes an inner circumferential portion 53b that extends radially inward from one end of the outer circumferential portion 53a. The inner circumferential portion 53b of the second brake hub 53 is axially fitted and fixed by welding or the like, for example, to the first carrier 31c of the first planetary gear mechanism 31 (see FIG. 2), whereby the second brake hub 53 is axially positioned by the first carrier 31c. In the embodiment, one end of a pinion shaft of the first pinion gears 31p is rotatably supported by the first carrier 31c, and the other end is rotatably supported by the inner circumferential portion 53b of the second brake hub 53. However, the other end of the pinion shaft of the first pinion gears 31p may be rotatably supported by the first carrier 31c, instead of the inner circumferential portion 53b of the second brake hub 53. A plurality of engagement tabs 313c that each have a substantially trapezoidal cross section and axially protrude toward the second planetary gear mechanism 32 is formed at regular intervals on a free end portion (the right end in the figure, i.e., the end portion on the second planetary gear mechanism 32 side) of the axially-extending portion 312c of the first carrier 31c, as shown in FIGS. 6 and 7. The first carrier 31c is coupled to the coupling member 60 that extends circumferentially inward (radially inward) from the second ring gear 32r of the second planetary gear mechanism 32 through the plurality of engagement tabs 313c.

The coupling member 60 is formed ring-like, and includes an outer circumferential portion 60a that is fitted to an inner circumferential portion of the second ring gear 32r of the second planetary gear mechanism 32 and axially fixed to the second ring gear 32r by a snap ring; and an inner circumferential portion 60b that is axially offset from the outer circumferential portion 60a toward the first planetary gear mechanism 31 (the ring gear flange 40). In the embodiment, the outer circumferential portion 60a of the coupling member 60 is formed with gear teeth that mesh with the gear teeth of the second ring gear 32r, and together with the gear teeth configure a fitted portion with an aligning function. In addition, as shown in FIG. 6, the inner circumferential portion 60b of the coupling member 60 faces the inner circumferential portion 40b of the ring gear flange 40 fixed to the first ring gear 31r across a relatively small space, and a thrust bearing 65 is disposed between the inner circumferential portion 60b of the coupling member 60 and the inner circumferential portion 40b of the ring gear flange 40. The thrust bearing 65 is also disposed between the inner circumferential portion 40b of the ring gear flange 40 and the radially-extending portion 311c of the first carrier 31c, and between the inner circumferential portion 60b of the coupling member 60 and the second carrier 32c of the second planetary gear mechanism 32.

As shown in FIGS. 6 and 7, a plurality of engagement tabs 60c that each protrude radially inward and can respectively mesh with the plurality of engagement tabs 313c of the first carrier 31c is formed at regular intervals on the inner circumferential portion 60b of the coupling member 60. In the embodiment, if the first carrier 31c of the first planetary gear mechanism 31 and the coupling member 60 are coaxially positioned with the engagement tabs 313c and the engagement tabs 60c meshed as shown in FIG. 7, a slight backlash (gap) is formed in the circumferential direction between adjacent engagement tabs 313c and engagement tabs 60c, and a gap G (see FIG. 7) larger than the backlash is formed between a bottom land between adjacent engagement tabs 60c of the coupling member 60 and an outer circumferential surface of the engagement tabs 313c of the first carrier 31c. Specifically, the coupling member 60 is fitted with radial play to the axially-extending portion 312c of the first carrier 31c, whereby the engagement tabs 313c of the first carrier 31c and the engagement tabs 60c of the coupling member 60 configure a fitted portion (trapezoidal tooth spline) without an aligning function. As shown in FIG. 6, the inner circumferential portion 60b (the engagement tabs 60c) of the coupling member 60 is fitted to the axially-extending portion 312c (the engagement tabs 313c) of the first carrier 31c more circumferentially inward than a portion where the first ring gear 31r of the first planetary gear mechanism 31 and the first brake hub 43 of the brake B1 are coupled together, that is, a portion where the ring gear flange 40 (the inner circumferential portion 40b) and the inner circumferential portion 43b of the first brake hub 43 are fixed together, and more circumferentially inward than the plurality of thrust bearings 35, whereby the second ring gear 32r is coupled to the second brake hub 53 of the brake B2 through the coupling member 60 and the first carrier 31c.

As described above, in the transmission device 30 of the embodiment, the second planetary gear mechanism 32 is disposed between the first planetary gear mechanism 31 on the input shaft 34 side and the third planetary gear mechanism 33 on the output shaft 35 side, and the second ring gear 32r of the second planetary gear mechanism 32 is held stationary by the brake B2 when forming the second speed (a second shift speed), which is a lower speed than the third speed and the fifth speed (lower speed than a first shift speed) that are shift speeds at which the first ring gear 31r is held stationary by the brake B1. The brake B1 is disposed circumferentially outward of the second planetary gear mechanism 32 so as to at least partially overlap with the second planetary gear mechanism 32 as viewed from the radial direction, and the brake B2 is disposed circumferentially outward of the first planetary gear mechanism 31 so as to at least partially overlap with the first planetary gear mechanism 31 as viewed from the radial direction. The brake B2 requires a larger torque capacity than the brake B1 when engaged to form the second speed, and the brake B2 may be at least partially disposed circumferentially outward of the first planetary gear mechanism 31 that is disposed on the input shaft 34 side. In such case, although the size of the transmission case 22 generally increases on the input shaft 34 side, the torque capacity of the brake B2 can be secured while suppressing an increase in the size of the transmission case 22 on the outer circumferential side of the first planetary gear mechanism 31. If the brake B1 that has a smaller required torque capacity compared to the brake B2 is at least partially disposed circumferentially outward of the second planetary gear mechanism 32, an increase in the size of the transmission case 22 on the outer circumferential side of the second planetary gear mechanism 32 can be suppressed. Accordingly, the transmission device 30 of the embodiment can be configured more compact.

In the transmission device 30, the first carrier 31c and the second ring gear 32r are coupled to each other through the fitted portion without an aligning function, which is formed from the engagement tabs 313c and the engagement tabs 60c. Thus, the axial length of the engagement tabs 313c and the engagement tabs 60c can be reduced by ensuring the radial thickness (height of the contact surfaces in the circumferential direction) of the engagement tabs 313c and the engagement tabs 60c. Therefore, compared to coupling the first carrier 31c and the second ring gear 32r to each other through a spline fitted portion (involute spline) with an aligning function, for example, the first carrier 31c and the second ring gear 32r can be coupled while closer together in the axial direction. As a consequence, the axial length of the transmission device 30 can be further shortened. The coupling member 60 includes the outer circumferential portion 60a that is fitted to the inner circumferential portion of the second ring gear 32r; and the inner circumferential portion 60b that is fitted with at least radial play (the gap G described above) to the axially-extending portion 312c of the first carrier 31c. If the coupling member 60 is used, the axial length of the transmission device 30 can be shortened while easily configuring the fitted portion without an aligning function between the second ring gear 32r and the first carrier 31c.

The first carrier 31c includes the ring-like radially-extending portion 311c that rotatably supports the first pinion gears 31p; and the axially-extending portion 312c that axially extends from the inner circumferential portion of the radially-extending portion 311c toward the second planetary gear mechanism 32. The coupling member 60 is fitted to the axially-extending portion 312c of the first carrier 31c, and the first ring gear 31r is fixed to the ring-like ring gear flange 40 that is rotatably supported by the axially-extending portion 312c between the radially-extending portion 311c of the first carrier 31c and the coupling member 60. Thus, an increase in the axial length of the transmission device 30 can be suppressed, while more precisely aligning the first ring gear 31r around the center axis of the transmission device 30. The first brake hub 43 of the brake B1 may be fixed to the ring gear flange 40 at a position that overlaps with the axially-extending portion 312c of the first carrier 31c as viewed from the radial direction. In such case, an increase in the axial length of the transmission device 30 can be suppressed while coupling together the first ring gear 31r and the first brake hub 43 of the brake B1. In addition, by axially offsetting the inner circumferential portion 40b of the ring gear flange 40 toward the coupling member 60 and disposing the thrust bearings 65 on both axial sides of the inner circumferential portion 40b, an increase in the axial length of the transmission device 30 can be suppressed while axially supporting the ring gear flange 40 that is fixed to the first ring gear 31r.

The third planetary gear mechanism 33 may be configured as a single-pinion type planetary gear mechanism that includes the third sun gear 33s that is coupled to the second sun gear 32s of the second planetary gear mechanism 32; the third carrier 33c that is coupled to the output shaft 35 and rotatably supports the third pinion gears 33p that mesh with the third sun gear 33s; and the third ring gear 33r that is coupled to the second carrier 32c and meshes with the third pinion gears 33p. If thus configured, the transmission device 30 can be made more compact overall, and the number of parts can be reduced.

In the transmission device 30 of the embodiment, the second ring gear 32r of the second planetary gear mechanism 32 and the first carrier 31c of the first planetary gear mechanism 31, which are both fastened by the brake B2, are coupled together by the coupling member 60 that extends circumferentially inward from the second ring gear 32r. The first carrier 31c is also coupled to the second brake hub 53 that configures the brake B2. Thus, by using the coupling member 60 that extends circumferentially inward from the second ring gear 32r, the first carrier 31c of the first planetary gear mechanism 31 and the second ring gear 32r of the second planetary gear mechanism 32 can be coupled together at a position closer to the center axis of the transmission device 30. Therefore, when holding the second ring gear 32r of the second planetary gear mechanism 32 stationary to the transmission case 22 by the brake B2, it is possible to suppress the transmission of vibrations excited in the second ring gear 32r due to the second ring gear 32r meshing with the second pinion gears 32p to the transmission case 22 through the brake B2. By coupling the first carrier 31c to the second brake hub 53 of the brake B2, the path from the second ring gear 32r to the brake B2 can be further lengthened, so that vibrations excited in the second ring gear 32r of the second planetary gear mechanism 32 when holding the second ring gear 32r stationary to the transmission case 22 by the brake B2 can be well dampened. In addition, by coupling the second ring gear 32r to the second brake hub 53 through the first carrier 31c, vibrations excited in the second ring gear 32r can be well dampened by the inertia of the first carrier 31c. Thus, in the transmission device 30, it is possible to well suppress the transmission of vibrations to the transmission case 22 when the second ring gear 32r of the second planetary gear mechanism 32 is held stationary to the transmission case 22 by the brake B2, and the occurrence of noise can also be reduced as a consequence.

If the coupling member 60 that includes the outer circumferential portion 60a that is fitted to the inner circumferential portion of the second ring gear 32r, and the inner circumferential portion 60b that is fitted to the first carrier 31c is used, the first carrier 31c of the first planetary gear mechanism 31 and the second ring gear 32r of the second planetary gear mechanism 32 can be easily coupled at a position closer to the center axis of the transmission device 30.

In the transmission device 30, the second ring gear 32r of the second planetary gear mechanism 32 is held stationary by the brake B2 when forming the sixth speed, which is a higher speed than the third speed and the fifth speed that are shift speeds at which the first ring gear 31r of the first planetary gear mechanism 31 is held stationary by the brake B1. According to the transmission device 30, the inner circumferential portion 60b (the engagement tabs 60c) of the coupling member 60 is fitted to the axially-extending portion 312c (the engagement tabs 313c) of the first carrier 31c more circumferentially inward than a portion where the first ring gear 31r of the first planetary gear mechanism 31 and the first brake hub 43 of the brake B1 are coupled together, that is, a portion where the ring gear flange 40 (the inner circumferential portion 40b) and the inner circumferential portion 43b of the first brake hub 43 are fixed together. Thus, the input torque and the rotation speed of the input shaft 34 are relatively low, and when holding the second ring gear 32r stationary by the brake B2 in order to form the sixth speed at which noise caused by vibrations tends to become more conspicuous, it is possible to suppress the transmission of vibrations excited in the second ring gear 32r due to the second ring gear 32r meshing with the second pinion gears 32p to the transmission case 22 through the brake B2.

The engagement tabs 313c of the axially-extending portion 312c and the engagement tabs 60c of the coupling member 60 configure the fitted portion without an aligning function between the inner circumferential portion 60b of the coupling member 60 and the axially-extending portion 312c of the first carrier 31c, thereby suppressing interference with the aligning function of the second planetary gear mechanism 32 through engagement of the brake B2. Therefore, the occurrence of an excessive force caused by axial center displacement among rotation elements in the second planetary gear mechanism 32 that transfers torque during engagement of the brake B2 can be suppressed. In addition, vibrations excited in the second ring gear 32r during engagement of the brake B2 can be well reduced. However, instead of providing the fitted portion without an aligning function between the inner circumferential portion 60b of the coupling member 60 and the axially-extending portion 312c of the first carrier 31c, the fitted portion without an aligning function may be provided between the outer circumferential portion 60a of the coupling member 60 and the second ring gear 32r. Alternatively, the fitted portion without an aligning function may be provided between both the inner circumferential portion 60b of the coupling member 60 and the axially-extending portion 312c of the first carrier 31c, and the outer circumferential portion 60a of the coupling member 60 and the second ring gear 32r.

The second brake hub 53 can be precisely aligned around the center axis of the transmission device 30 by fixing and radially positioning the second brake hub 53 of the brake B2 with respect to the first carrier 31c. This stabilizes the orientation of the second brake hub 53 during engagement of the brake B2, and can suppress the occurrence of an excessive force caused by axial center displacement among rotation elements in the second planetary gear mechanism 32. In addition, the first ring gear 31r is fixed to the ring-like ring gear flange 40 that is rotatably supported by the axially-extending portion 312c between the radially-extending portion 311c of the first carrier 31c and the coupling member 60, whereby the first ring gear 31r can be precisely aligned around the center axis of the transmission device 30. Therefore, the occurrence of an excessive force caused by axial center displacement among rotation elements in the first planetary gear mechanism 31 during engagement of the brake B2 can be suppressed.

As described above, the transmission device 30 of the embodiment includes the brake B1 that is disposed circumferentially outward of the second planetary gear mechanism 32 so as to at least partially overlap with the second planetary gear mechanism 32 as viewed from the radial direction, and holds the first ring gear 31r of the first planetary gear mechanism 31 stationary to the transmission case 22 when forming the third speed and the fifth speed; and the brake B2 that is disposed circumferentially outward of the first planetary gear mechanism 31 so as to at least partially overlap with the first planetary gear mechanism 31, and holds the second ring gear 32r of the second planetary gear mechanism 32 stationary to the transmission case 22 when forming the second speed. Therefore, the transmission device 30 can be configured more compact. In the transmission device 30 of the embodiment, the second ring gear 32r of the second planetary gear mechanism 32 and the first carrier 31c of the first planetary gear mechanism 31, which are both fastened by the brake B2, are coupled together by the coupling member 60 that extends circumferentially inward from the second ring gear 32r. The first carrier 31c is also coupled to the second brake hub 53 that configures the brake B2. Therefore, it is possible to well suppress the transmission of vibrations to the transmission case 22 when the second ring gear 32r of the second planetary gear mechanism 32 is held stationary to the transmission case 22 by the brake B2, and the occurrence of noise can also be reduced as a consequence.

Figure 8:
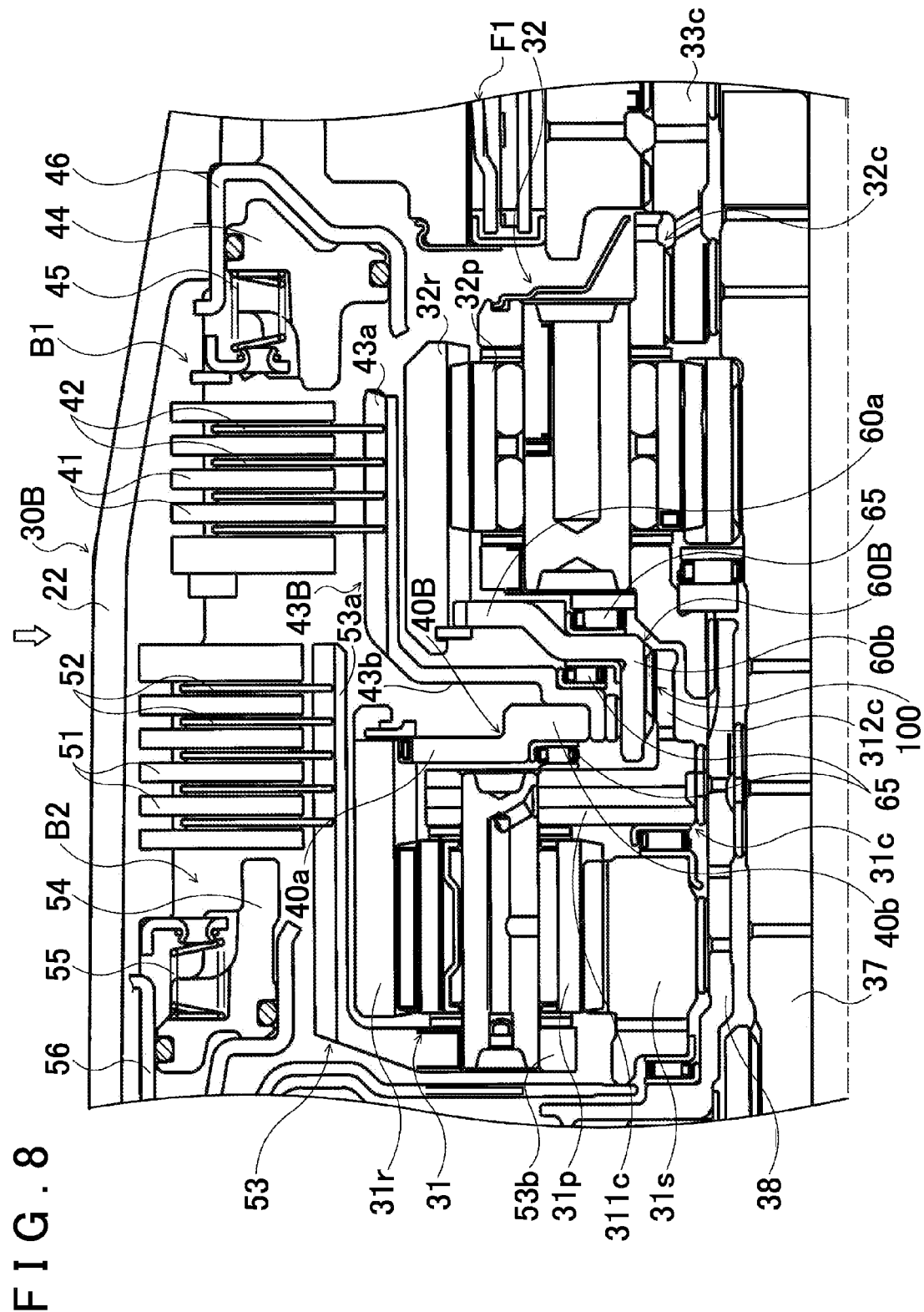
FIG. 8 is an enlarged view of an essential portion of a transmission device 30B according to a modification.

Note that, in the transmission device 30 of the embodiment described above, the outer circumferential portion 60a of the coupling member 60 is coupled to the second ring gear 32r through the fitted portion with an aligning function, which is formed from the gear teeth of the second ring gear 32r and the gear teeth formed on the outer circumferential portion 60a. In addition, the inner circumferential portion 60b of the coupling member 60 is coupled to the first carrier 31c through the fitted portion without an aligning function, which is formed from the engagement tabs 313c and the engagement tabs 60c. However, the mode of coupling the second ring gear 32r and the first carrier 31c is not limited to this example. In other words, as shown by a transmission device 30B in FIG. 8, the outer circumferential portion 60a of the coupling member 60 may be coupled to the second ring gear 32r through a fitted portion with an aligning function that is formed from the gear teeth of the second ring gear 32r and the gear teeth formed on the outer circumferential portion 60a. In addition, the inner circumferential portion 60b of the coupling member 60 may be coupled, for example, to the first carrier 31c through a fitted portion 100 with an aligning function that is formed from an involute spline. According to the transmission device 30B of the modification, as shown in the figure, the inner circumferential portion 60b of a coupling member 60B axially extends toward the first planetary gear mechanism 31, and the inner circumferential portion 60b is coupled to the outer periphery of the axially-extending portion 312c of the first carrier 31c through a spline-fitted portion that is formed from an involute spline. In the transmission device 30B, the inner circumferential portion 43b of the first brake hub 43 of the first brake B1 is rotatably supported by the inner circumferential portion 60b of the coupling member 60B through a bush, and the inner circumferential portion 40b of a ring gear flange 40B is fixed to the inner circumferential portion 43b of the first brake hub 43. The thrust bearing 65 is also disposed between the radially-extending portion 311c of the first carrier 31c and the inner circumferential portion 40b of the ring gear flange 40B, between the inner circumferential portion 43b of the first brake hub 43B and the coupling member 60B, and between the coupling member 60B and the second carrier 32c of the second planetary gear mechanism 32. In the transmission device 30B thus configured, the second ring gear 32r of the second planetary gear mechanism 32 is aligned by the first carrier 31c of the first planetary gear mechanism 31. Therefore, it is possible to align the rotation elements of the second planetary gear mechanism 32 to suppress the occurrence of an excessive force caused by axial center displacement among the rotation elements in the second planetary gear mechanism 32 during engagement of the brake B2 and reduce vibrations excited in the second ring gear 32r.

Here, the correspondence will be described between main elements in the embodiment and main elements of the invention as listed in the Summary of the Invention. Specifically, in the embodiment described above, the transmission device 30 capable of transmitting power applied to the input shaft 34 to the output shaft 35 while changing the speed ratio to a plurality of stages corresponds to a "transmission device". The single-pinion type first planetary gear mechanism 31 including the first sun gear 31s that is coupled to the input shaft 34, the first carrier 31c that rotatably supports the first pinion gears 31c that mesh with the first sun gear 31s, and the first ring gear 31r that meshes with the first pinion gears 31p corresponds to a "first planetary gear mechanism". The single-pinion type second planetary gear mechanism 32 including the second sun gear 32s, the second carrier 32c that rotatably supports the second pinion gears 32p that mesh with the second sun gear 32s, and the second ring gear 32r that is coupled to the first carrier 31c and meshes with the second pinion gears 32p corresponds to a "second planetary gear mechanism". The third planetary gear mechanism 33 including the third sun gear 33s that is coupled to the second sun gear 32s, and the third carrier 33c that is coupled to the output shaft 35 corresponds to a "third planetary gear mechanism". The transmission case 22 that accommodates the first, second, and third planetary gear mechanisms 31 to 33 corresponds to a "case". The clutch C1 that can couple and uncouple the input shaft 34 and the second sun gear 32s corresponds to a "first clutch". The clutch C2 that can couple and uncouple the input shaft 34 and the second carrier 32c corresponds to a "second clutch". The brake B1 that can hold the first ring gear 31r stationary to the transmission case 22 corresponds to a "first brake". The brake B2 that can hold the second ring gear 32r stationary to the transmission case 22 corresponds to a "second brake". The coupling member 60 that extends circumferentially inward from the second ring gear 32r and couples the first carrier 31c and the second ring gear 32r corresponds to a "coupling member".

Note that the correspondence between the main elements of the embodiment and modification thereof and the main elements of the invention as described in the Summary of the Invention does not limit the elements of the invention as described in the Summary of the Invention, and the embodiment and modification are only examples for giving a specific description of a mode for carrying out the invention explained in the Summary of the Invention. In other words, any interpretation of the invention described in the Summary of the Invention shall be based on the description therein; the embodiment is merely one specific example of the invention described in the Summary of the Invention.

The above embodiment was used to describe a mode for carrying out the present invention. However, the present invention is not particularly limited to such an example, and various modifications are obviously possible without departing from the scope of the present invention.

The present invention may be utilized in the manufacturing industry for transmission devices.

What is claimed is:

1. A transmission device capable of transmitting power applied to an input shaft to an output shaft while changing a speed ratio to a plurality of stages, the transmission device comprising:
    a single-pinion type first planetary gear mechanism including a first sun gear that is coupled to the input shaft, a first carrier that rotatably supports a first pinion gear that meshes with the first sun gear, and a first ring gear that meshes with the first pinion gear;
    a single-pinion type second planetary gear mechanism including a second sun gear, a second carrier that rotatably supports a second pinion gear that meshes with the second sun gear, and a second ring gear that is coupled to the first carrier and meshes with the second pinion gear;
    a third planetary gear mechanism including a rotation element that is coupled to the second sun gear, and a rotation element that is coupled to the output shaft;
    a case that accommodates the first, second, and third planetary gear mechanisms;
    a first clutch capable of coupling and uncoupling the input shaft and the second sun gear;
    a second clutch capable of coupling and uncoupling the input shaft and the second carrier;
    a first brake that is engaged when forming a first shift speed, and capable of holding the first ring gear stationary to the case; and
    a second brake that is engaged when forming a second shift speed that is a lower speed than the first shift speed, and capable of holding the second ring gear stationary to the case, wherein
    the first planetary gear mechanism is disposed more toward the input shaft side than the second planetary gear mechanism, and the second planetary gear mechanism is disposed more toward the input shaft side than the third planetary gear mechanism, and
    the first brake is disposed circumferentially outward of the second planetary gear mechanism so as to at least partially overlap with the second planetary gear mechanism as viewed from a radial direction, and the second brake is disposed circumferentially outward of the first planetary gear mechanism so as to at least partially overlap with the first planetary gear mechanism as viewed from the radial direction.

2. The transmission device according to claim 1, wherein the first carrier and the second ring gear are coupled to each other through a fitted portion without an aligning function.

3. The transmission device according to claim 2, wherein
the first carrier and the second ring gear are coupled
through a coupling member that includes an outer circumferential portion fitted to an inner circumferential portion of the second ring gear, and an inner circumferential portion fitted to the first carrier, and
the coupling member is fitted with at least radial play to at least one of the second ring gear and the first carrier.

4. The transmission device according to claim 3, wherein
the first carrier includes a ring-like radially-extending portion that rotatably supports the first pinion gear, and an axially-extending portion that axially extends from an inner circumferential portion of the radially-extending portion toward the second planetary gear mechanism,
the coupling member is fitted to the axially-extending portion of the first carrier, and
the first ring gear is fixed to a ring-like flange member that is rotatably supported by the axially-extending portion between the radially-extending portion of the first carrier and the coupling member.

5. The transmission device according to claim 4, wherein
a first brake hub that configures the first brake is fixed to the flange member at a position that overlaps with the axially-extending portion of the first carrier as viewed from the radial direction.

6. The transmission device according to claim 5, wherein
an inner circumferential portion of the flange member is axially offset toward the coupling member, and a thrust bearing is disposed on both axial sides of the inner circumferential portion of the flange member.

7. The transmission device according to claim 6, wherein
the third planetary gear mechanism is a single-pinion type planetary gear mechanism including a third sun gear that is coupled to the second sun gear, a third carrier that is coupled to the output shaft and rotatably supports a third pinion gear that meshes with the third sun gear, and a third ring gear that is coupled to the second carrier and meshes with the third pinion gear, and
the transmission device further includes a third brake capable of holding the third ring gear stationary to the case.

8. The transmission device according to claim 4, wherein
an inner circumferential portion of the flange member is axially offset toward the coupling member, and a thrust bearing is disposed on both axial sides of the inner circumferential portion of the flange member.

9. The transmission device according to claim 1, wherein
the third planetary gear mechanism is a single-pinion type planetary gear mechanism including a third sun gear that is coupled to the second sun gear, a third carrier that is coupled to the output shaft and rotatably supports a third pinion gear that meshes with the third sun gear, and a third ring gear that is coupled to the second carrier and meshes with the third pinion gear, and
the transmission device further includes a third brake capable of holding the third ring gear stationary to the case.

* * * * *